(12) United States Patent
Rufo et al.

(10) Patent No.: US 7,607,536 B2
(45) Date of Patent: Oct. 27, 2009

(54) PACKAGE WITH ALIGNED DISCS ON OPPOSITE COVERS

(75) Inventors: George F. Rufo, Dalton, MA (US); James Philippe, Sanford, ME (US)

(73) Assignee: MeadWestvaco Corporation, Glen Allen, VA (US)

(*) Notice: Subject to any disclaimer, the term of this patent is extended or adjusted under 35 U.S.C. 154(b) by 58 days.

(21) Appl. No.: 11/809,036

(22) Filed: May 31, 2007

(65) Prior Publication Data
US 2007/0235354 A1    Oct. 11, 2007

Related U.S. Application Data

(63) Continuation of application No. 11/393,291, filed on Mar. 30, 2006, now abandoned.

(60) Provisional application No. 60/666,648, filed on Mar. 30, 2005.

(51) Int. Cl.
*B65D 85/57* (2006.01)
(52) U.S. Cl. ..................... 206/308.1; 206/310
(58) Field of Classification Search .................. 206/307, 206/307.1, 308.1, 309–313, 472, 493
See application file for complete search history.

(56) References Cited

U.S. PATENT DOCUMENTS

| | | | |
|---|---|---|---|
| 4,535,888 A * | 8/1985 | Nusselder | 206/311 |
| 5,743,390 A | 4/1998 | Pozzoli | |
| 6,092,653 A | 7/2000 | Pozzoli | |
| 6,109,432 A | 8/2000 | Pozzoli | |
| D430,445 S | 9/2000 | Pozzoli | |
| 6,283,284 B1 | 9/2001 | Crane et al. | |
| 6,626,291 B2 | 9/2003 | Pozzoli | |
| 6,634,495 B2 | 10/2003 | Hass | |
| 6,871,738 B2 | 3/2005 | Chang | |
| 6,886,687 B2 * | 5/2005 | Bolongia et al. | 206/308.1 |
| 6,957,764 B2 | 10/2005 | Pozzoli | |
| 7,073,663 B2 | 7/2006 | Delaere et al. | |
| 2003/0150755 A1 | 8/2003 | Chen | |

* cited by examiner

Primary Examiner—Luan K Bui
(74) Attorney, Agent, or Firm—Thomas A. Boshinski

(57) ABSTRACT

A package for housing two discs including a cover forming an elongated spine panel with first and second opposing panels extending therefrom such that the opposing panels selectively rotate between open and closed positions. First and second partial trays attach to the first and second opposing panels, respectively, and are laterally spaced so that when closed, the thickness of the package is approximately equal to that of one of the trays. Each partial tray has a planar surface forming a periphery and a recess, a rosette near a first side of the tray for engaging a central aperture to retain a disc within the recess and a spacing rim upstanding from the planar surface. The spacing rim is U-shaped so that in the closed position, the spacing rims do not overlap.

20 Claims, 4 Drawing Sheets

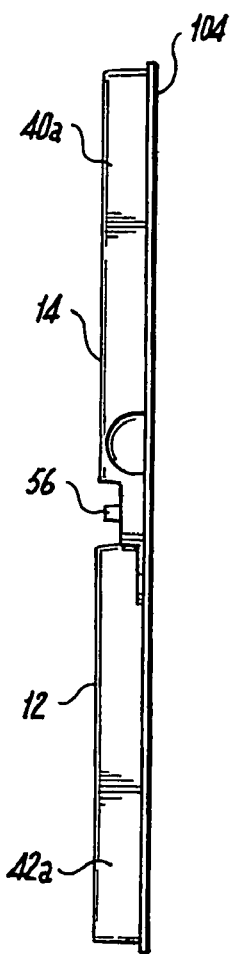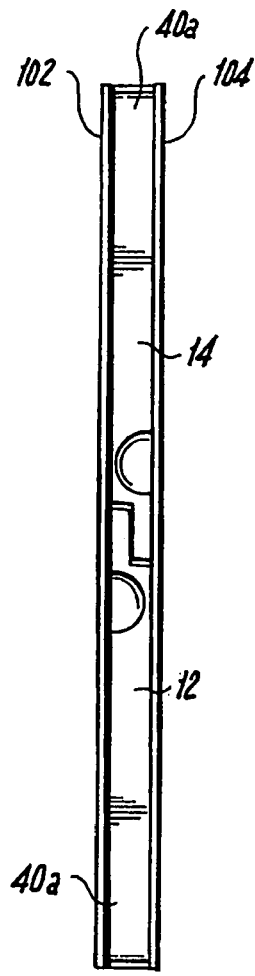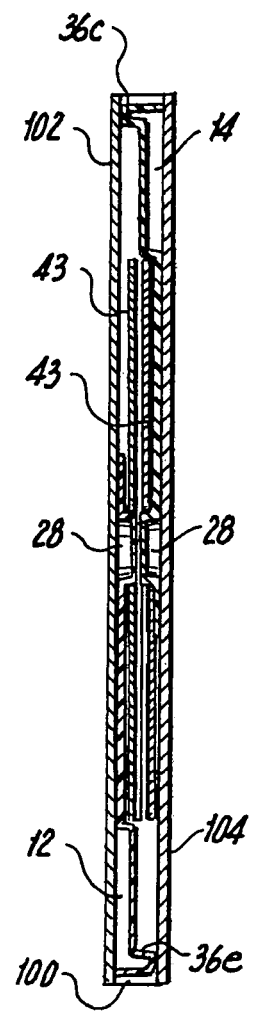
FIG. 2   FIG. 3   FIG. 4

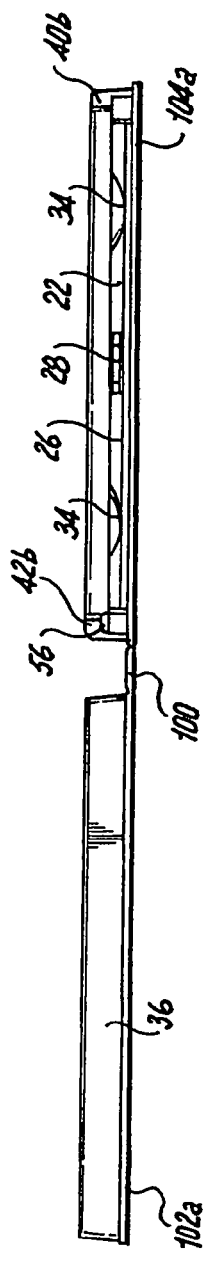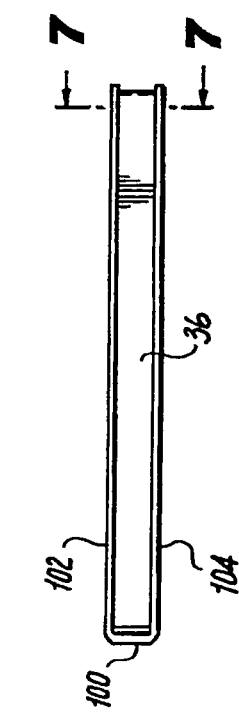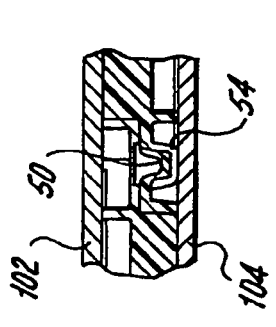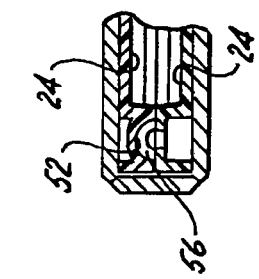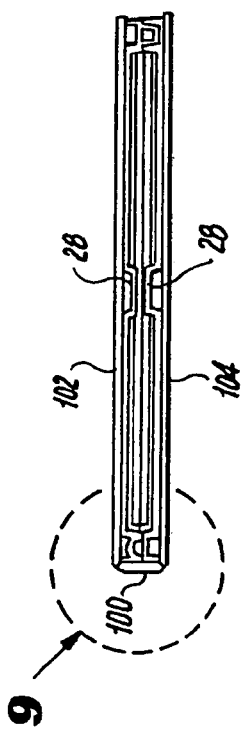

PACKAGE WITH ALIGNED DISCS ON OPPOSITE COVERS

CROSS-REFERENCE TO RELATED APPLICATION

This application claims priority to U.S. Provisional Patent Application No. 60/666,648, filed Mar. 30, 2005, which is incorporated herein by reference. This application is a continuation of U.S. patent application Ser. No. 11/393,291 filed Mar. 30, 2006, now abandoned.

BACKGROUND OF THE INVENTION

1. Field of the Invention

The present invention relates generally to a closable storage package for a recording medium and, more particularly, to a package comprising a paper board cover assembled to multiple plastic disc holders for storing multiple discs.

2. Description of the Prior Art

Various types of planar discs are in use at the present time to record and store information which is to be retrieved by various means, such as by optical or magnetic means. Typical of such discs are compact discs in which information is digitally recorded by use of a laser beam and then read optically by a laser beam. Such discs are used to record audio information, such as musical renditions, video information such as visual images and digital information for use as read only and other memories for use in various applications; such as computer applications. In most instances, at the present time, such discs are sold with information already recorded thereon. In other applications, such discs are sold in blank form and are used by the customer to record information thereon. In the latter case, for example, optical discs are sold for use as computer storage media and are used in hard disc storage systems. As used herein, the term compact disc, CD or disc is intended to encompass all such discs, whatever their size, for all known or proposed uses.

Compact discs containing laser recorded information are typically packaged in injection molded plastic enclosures designed to hold one or more CDs for protecting the discs during storage and shipment. Enclosures commonly used at the present time, such as the well known "jewel box," comprise a three piece assembly consisting of a base or bottom element, an insert or tray in the base/bottom element for positioning and supporting the disc in the base/bottom element, e.g., by a center projection (commonly referred to as a "rosette") which engages the periphery of the aperture in the center of the disc, and a lid or cover which is hinged to the base/bottom element and is closed thereon after the disc is mounted therein on the tray. Other enclosures utilize only two pieces, omit the tray, and position and support the disc via the center projection directly on the base/bottom element. The enclosure is, typically, at least partially transparent and graphics relating to the disc and containing trademark and sales promotional information are usually inserted in such a manner as to be visible through the enclosure.

Except for the printed matter inserted therein, the "jewel box" is entirely plastic. For this reason, as well as because the typical jewel box requires three separately injection molded elements which must be manually assembled, the use of this type of enclosure is relatively expensive. Moreover, the use of such an enclosure is believed to be ecologically unacceptable by many because the plastic is non-biodegradable and, in view of the huge volume of such enclosures in use today, the disposal of these enclosures poses either a real or potential environmental problem. One solution to both of these problems has been the development of hybrid packages comprising both paperboard and plastic components. These hybrid packages provide a CD package which is suitable and attractive for display, sale and storage of compact discs, yet which is both simple and inexpensive to manufacture.

For example, U.S. Pat. No. 4,709,812 to Kosterka, which is incorporated herein by reference, discloses a compact disc package formed from a prescored, preprinted unitary blank and at least one injection molded plastic compact disc holder or tray adhesively adhered to one segment of the blank, the blank being adapted to fold along fold lines to position a blank segment over the top of the disc holder to sandwich it, in book style, between the segment to which it is adhered and the overlying segment. The problem with this type of arrangement is that the book frequently opens and provides little protection for the disc there within.

When it is desired to have a disc package house multiple discs, it has become common to form a book like package having opposite panels connected by a spine panel and to adhesively or mechanically adhere an injection molded plastic disc holder or tray to each of the facing panels. In this manner, when the book is closed, the trays seat upon one another in face-to-face relationship. Typically the height of upstanding peripheral rims around at least a portion of at least one of the trays limits the thickness of the book when the book is in the closed position to assure that the discs on the panels do not contact each other. The problem with this sort of arrangement is that the thickness of each tray doubles the thickness of the package as compared to a package containing only a single disc holder. Such a double thickness package occupies more retail space than is desirable and is wasteful of plastic material.

It should be apparent, therefore, that efforts to date directed at hybrid packaging containing multiple discs suffer from one or more shortcomings which make the resulting CD packaging unsatisfactory. This is because prior art hybrid packaging is, typically, either uneconomical to manufacture and/or is expensive to transport, store and display in retail stores. Accordingly, there remains a need for a simple, inexpensive to manufacture, inexpensive to ship and display multiple-disc hybrid CD package which is reliable for use over the long term.

SUMMARY OF THE INVENTION

It is an object of the subject disclosure to provide a package for holding discs that is relatively thin despite having co-axially aligned discs.

It is another object of the subject disclosure to provide a package for holding discs that is easy to manufacture because it has two parts that are unitary.

It is still another object of the subject disclosure to provide a package for holding discs that minimizes the required materials.

The present disclosure is directed to a package for housing two discs including a cover forming an elongated spine panel with first and second opposing panels extending therefrom such that the opposing panels selectively rotate between open and closed positions. First and second partial trays attach to the first and second opposing panels, respectively, each partial tray having a planar surface forming a periphery and a recess, a rosette near a first side of the tray for engaging a central aperture to retain a disc at least partially within the recess, and a spacing rim upstanding from the planar surface. The spacing rim includes a lateral side opposing the first side, and two transverse sides, wherein in the closed position, the spacing rims do not overlap. Preferably, in the closed position, a thickness of the package is approximately equal to the first and second opposing panels plus a height of the spacing rim of the first partial tray. In further embodiments, the recesses are semi-circular and the package has means for retaining the package in the closed position.

In another embodiment, the subject disclosure is directed to a package for housing two discs including a cover forming an elongated spine panel in a plane with first and second opposing panels extending therefrom such that the opposing panels selectively rotate between an open position in which the opposing panels are substantially in the plane and a closed position in which the opposing panels are substantially perpendicular to the plane. A first partial tray attaches to the first opposing panel at a first end. The first partial tray has a planar surface forming a periphery, a substantially semi-circular recess opening to the periphery on a first side and finger wells opening to the recess, a rosette located centrally within the semi-circular recess for engaging a central aperture of a disc, a spacing rim upstanding from the planar surface, the spacing rim including a lateral side opposing the first side and two transverse sides, the lateral and opposing sides being near the periphery, and a male projection for retaining the package closed. A second partial tray attaches to the second opposing panel at a second end opposing the first end. The second partial tray has a planar surface forming a periphery, a substantially semi-circular recess opening to the periphery on a first side and finger wells opening to the recess, a rosette located centrally within the semi-circular recess for engaging a central aperture of a disc such that the rosettes are substantially co-axial in the closed position, a spacing rim upstanding from the planar surface, the spacing rim including a lateral side opposing the first side and two transverse sides, the lateral and opposing sides being near the periphery, and a female receptacle for engaging the male projection to selectively retain the package closed.

It should be appreciated that the present invention can be implemented and utilized in numerous ways, including without limitation as a process, an apparatus, a system, a device, and a method for applications now known and later developed. These and other unique features of the system disclosed herein will become more readily apparent from the following description and the accompanying drawings.

BRIEF DESCRIPTION OF THE DRAWINGS

So that those having ordinary skill in the art to which the disclosed system appertains will more readily understand how to make and use the same, reference may be had to the following drawings.

FIG. 2 is a side elevation view of the improved CD package of FIG. 1 in its open position.

FIG. 3 is a side elevation view of the improved CD package of FIG. 1 in its closed position.

FIG. 4 is a cross-sectional view of the improved CD package of the present invention in its closed position taken along a plane passing parallel to the spine of the package and through the aligned rosettes.

FIG. 5 is a top plan view of the improved CD package of the present invention in its open position.

FIG. 6 is a top plan view of the improved CD package of the present invention in its closed position.

FIG. 7 is a sectional view taken along line 7-7 in FIG. 6.

FIG. 8 is a sectional view of the improved CD package of the present invention in its closed position taken along a plane passing perpendicular to the spine of the package and through the aligned rosettes.

FIG. 9 is an enlarged detail view of portion 9 in FIG. 8.

DESCRIPTION OF PREFERRED EMBODIMENTS

Figure 1:
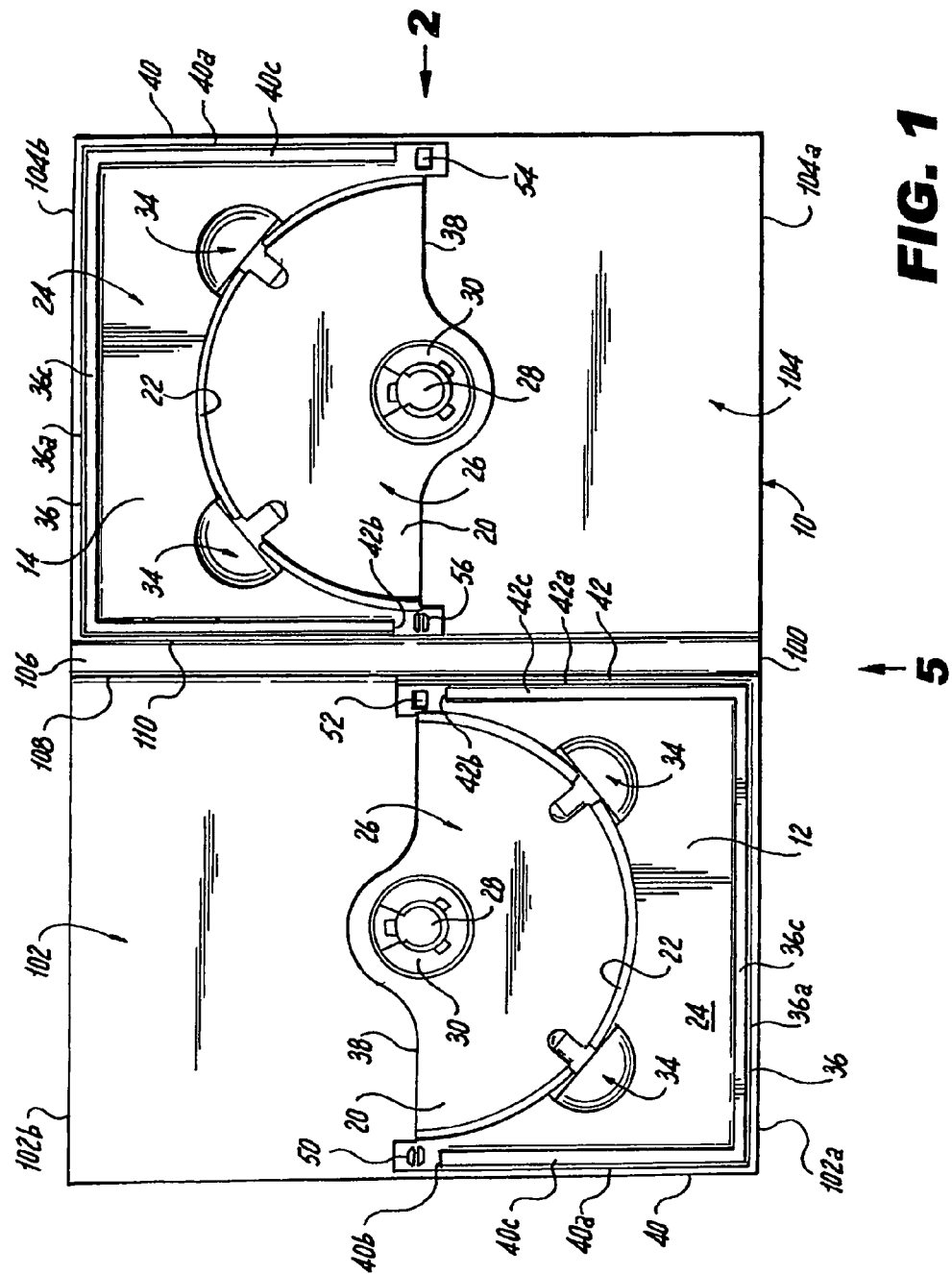
FIG. 1 is a plan view, of one embodiment of the improved CD package of the present invention in its open position.

The present invention overcomes many of the prior art problems associated with CD packages. The advantages, and other features of the packages disclosed herein, will become more readily apparent to those having ordinary skill in the art from the following detailed description of certain preferred embodiments taken in conjunction with the drawings which set forth representative embodiments of the present invention and wherein like reference numerals identify similar structural elements whenever possible.

All relative descriptions herein such as left, right, up, down, topside, underside and the like are with reference to the Figures, and not meant in a limiting sense. The illustrated embodiments can be understood as providing exemplary features of varying detail of certain embodiments, and therefore, unless otherwise specified, features, components, modules, elements, and/or aspects of the illustrations can be otherwise combined, interconnected, sequenced, separated, interchanged, positioned, and/or rearranged without materially departing from the disclosed systems or methods. Additionally, the shapes and sizes of components are also exemplary and unless otherwise specified, can be altered without materially affecting or limiting the disclosed technology to holding discs exclusively.

Figure 10:
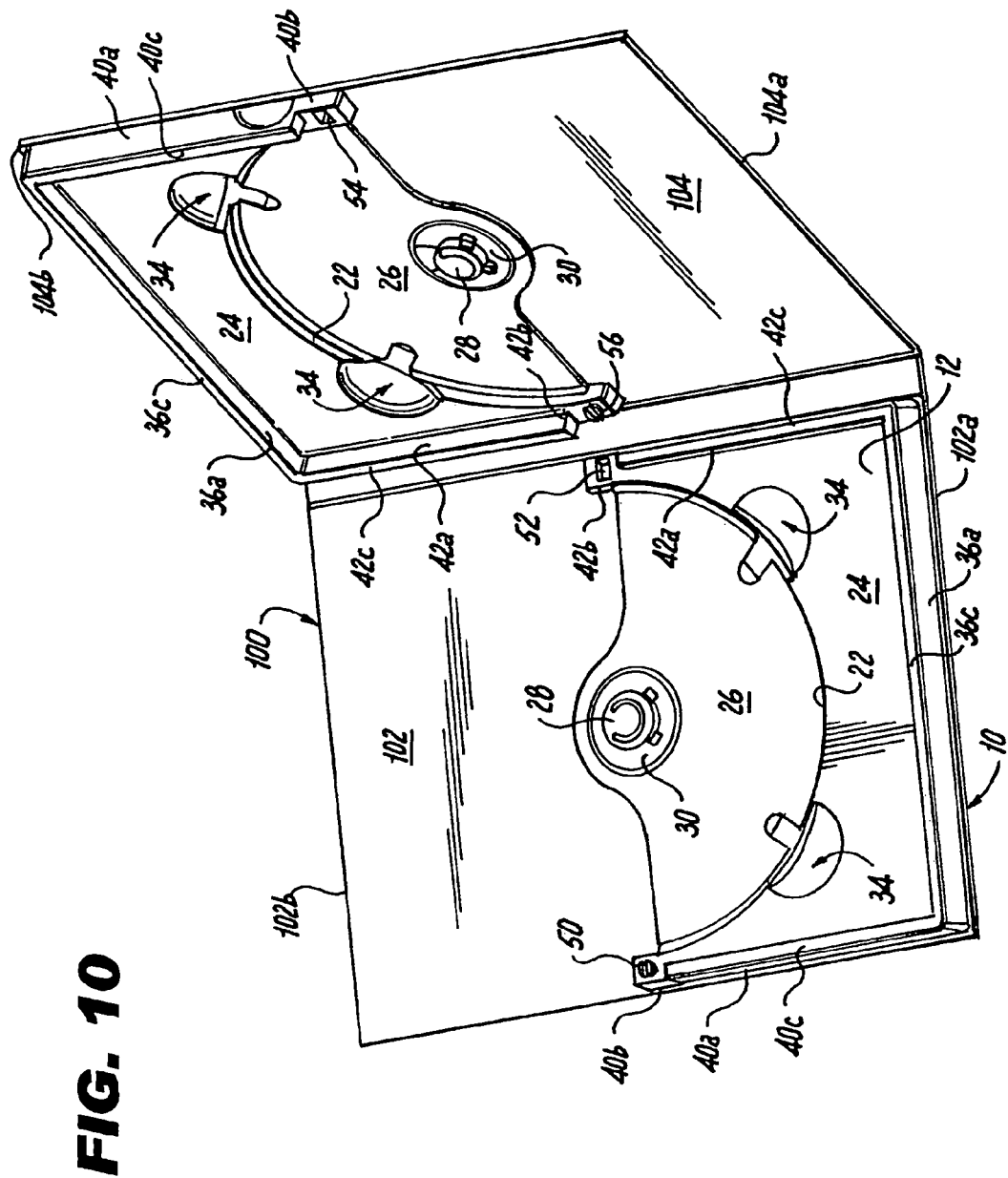
FIG. 10 is a perspective view of the improved CD package in a mostly, but not completely, open position.

A preferred embodiment of the present invention is illustrated in FIGS. 1-10, in which there is shown an improved CD package 10 for housing two discs. In brief overview, the package 10 includes two injection molded plastic partial trays 12, 14 and a paper board cover 100 which is, in the preferred embodiment, adhesively attached to each of the trays 12, 14 in such a manner that the plastic and paper components form a CD package, configured to resemble a book of a substantially single disk package thickness, which presents no alignment problems between the trays when the package is repetitively opened and closed.

Referring generally to FIGS. 1-10, tray 12 is a relatively rectangular, thin, plate-like member which is formed with a partial circular recess 20 defined by a partial circular side wall 22 extending downwardly from surrounding planar surface 24 to base 26. A rosette 28 for gripping a CD and holding it within recess 20 is molded on raised CD seat 30 which, itself, is molded on base 26. Rosette 28 is, typically, a vertical cylindrical section including radically outwardly biased gripping fingers for engaging the central opening of a CD placed thereon. Raised seat 30 provides a circular surface on which the annular area of the CD which is immediately adjacent the central disc aperture can be supported above the base 26. This area of the CD typically contains no recorded information and, therefore, contact between the CD in this area and the raised seat will not damage the CD. The CD may also be peripherally supported at its outer edges by a peripheral shelf (not shown) formed in circular sidewall 22. The outer edges of a CD also, typically, contain no recorded information in order to provide further assurance that contact of the recorded areas of the CD with the tray will be avoided. Planar surface 24 of tray 12 includes finger wells 34 which open to the base 26 of recess 20 to facilitate a user removing a disc from the recess 20. Recess 20, rosette 28 and finger wells 34 are all well known in the CD packaging art and need not be described in detail herein.

It is noteworthy that tray 12 is only a partial tray with one lateral side 36 and two connecting transverse sides 40, 42 having upstanding wall portions 36a, 40a, 42a for defining a spacing rim at or just inside the marginal edges of the tray periphery. Wall portions 40a, 42a extend from wall portion 36a to a position close to but spaced from opposite lateral side 38, which has no upstanding wall portion. As will be seen, when package 10 is closed, the wall portions assure a sufficient spacing between a CD mounted on the rosette 28 of tray 12 and a CD mounted on the rosette 28 of tray 14 that neither of the CDs become damaged by contact with the other. In addition, a male projection 50 rises from planar surface 24 adjacent the free end 40b of wall portion 40a and a female receptacle 52 is defined in planar surface 24 adjacent the free end 42b of wall portion 42a for engaging with a corresponding female/male receptacle/projection on tray 14.

Tray 14 is a relatively thin plate-like member which is substantially similar to tray 12. The configuration and elements of tray 12 apply equally to tray 14 and, therefore, like reference numerals denote like parts. The only difference is that tray 14 has a female receptacle 54 defined in planar surface 24 adjacent the free end 40b of wall portion 40a for engaging with the male projection 50 on tray 12 when the package 10 is closed. In like manner, tray 14 has a male projection 56 arising from planar surface 24 adjacent the free end 42b of wall portion 42a for engaging with female receptacle 52 on tray 12 when package 10 is closed. As a result, package 10 may be latched in the closed position when it is desired to do so.

In one embodiment, the engagement of male projection 56 on tray 14 with female receptacle 52 on tray 12 is weaker than the engagement of male projection 50 on tray 12 with female receptacle 54 on tray 14 (as by making projection 56 shorter than projection 50) so that, when the engagement of projection/receptacle 50/54 is overcome to open package 10, the engagement of projection/receptacle 56/52 does not interfere with the smooth opening of the package. Indeed, in most instances, the engagement of male projection 50 on tray 12 with female receptacle 54 on tray 14 is itself sufficient to maintain package 10 latched in the closed position and the engagement of projection 56 with receptacle 52 serves to facilitate assembly of the trays 12, 14 to paper board 100, as will be discussed more fully hereinafter. In another embodiment, projection 56 does not actually engage receptacle 52 but, rather, fits within receptacle 52 to serve as an alignment aid between trays 12 and 14.

The paper board 100 comprises a plurality of paper panels which are desirably formed from a presized, pre-printed unitary blank. In one embodiment of the invention, the blank includes two panels 102, 104 onto which the plastic trays 12, 14 are adhesively or mechanically attached, separated by a spine panel 106. Fold lines 108, 110 separate panels 102, 104, respectively, from spine panel 106 and allow the panels to be pivoted between package open and package closed positions. The panels may be single ply although, in some instances, it may be desirable for one or both of these panels to be two or multiple ply.

To assemble the paper board 100 and trays 12, 14, in a preferred embodiment, first and second trays 12, 14 are assembled to each other by causing the rosettes 28 to face each other with the free ends 40b, 42b of transverse wall portions 40a, 42a on each tray adjacent but spaced apart from each other, and with projection 50 of tray 12 and projection 56 of tray 14 inserted within, respectively, receptacle 54 of tray 14 and receptacle 52 of tray 12. As the rosettes are pressed toward each other, as can be seen from FIGS. 4 and 8, the projection 50 on tray 12 engages receptacle 54 on tray 14 (and, in one embodiment, projection 56 on tray 14 engages receptacle 52 on tray 12) to maintain the assembled CD package 10 in the closed position. A plurality of glue posts (not shown) are desirably provided on the underside of each tray for receiving adhesive. Alternatively, dabs of adhesive are applied directly to the tray undersides. The adhesive-bearing underside of tray 14 is pressed onto the desired position on panel 104 with the wall portions 42a of the trays adjacent fold line 110, after which the paper board cover is stretched around the spine edge 42a of the trays and panel 102 is pressed into adhesive contact with the adhesive-bearing underside of tray 12. With the trays dimensioned and configured so that, with rosettes 28 in face-to-face relationship, the free ends 40b, 42b on each tray 12, 14 are adjacent but spaced apart and the projections 50, 56 and receptacles 52, 54 are aligned or engaged. Discs (see FIG. 4) mount on the rosettes in a coaxially aligned orientation. The discs, however, do not touch each other because the height of wall portions 36a, 40a and 42a is sufficient to avoid their touching.

With reference to FIG. 4, it can be seen that with package 10 in the closed position, the tops 36c, 40c, 42c of wall portions 36a, 40a, 42a of each tray 12, 14 contact the surface of panel 102, 104 to which the other tray is mounted. Thus, the height of wall portions 36a, 40a, 42a determines the separation between discs 43 mounted on rosettes 28 and, when properly selected, assures that the discs 43 do not touch when package 10 is closed.

In one embodiment, each of trays 12, 14 is approximately one half the length of panels 102, 104 between its lateral sides 102a,ó and 104a,b. In this embodiment, wall portions 36a of trays 12, 14 are positioned closely adjacent the lateral marginal edges 102a, 104b of panels 102, 104. In other embodiments, panels 102, 104 may be longer than twice the length of the trays 12, 14, in which case wall portions 36a of trays 12, 14 are positioned a greater distance inwardly of the lateral marginal edges 102a, 104b of panels 102, 104. Typically, the length of panels 102, 104 is at least twice the combined length of trays 12, 14 so that overlap is generally avoided. Preferably, the trays are so positioned on panels 102, 104 and the rosettes 28 are so positioned on the trays that, when package 10 is closed, the free ends 40b, 42b of transverse wall portions 40a, 42a of trays 12, 14 are positioned adjacent to, but spaced from, each other and rosettes 28 on each of trays 12, 14 are in face-to-face relationship. This assures that discs 43 mounted on these rosettes are in coaxial alignment.

While the invention has been described with respect to preferred embodiments, those skilled in the art will readily appreciate that various changes and/or modifications can be made to the invention without departing from the spirit or scope of the invention as defined by the appended claims.

What is claimed is:

1. A package for housing two discs comprising:
  a) a cover forming an elongated spine panel with first and second opposing panels extending therefrom such that the opposing panels selectively rotate between open and closed positions; and
  b) first and second partial trays attached to the first and second opposing panels, respectively, each partial tray having: i) a planar surface forming a periphery and a recess; ii) a rosette near a first side of the tray for engaging a central aperture to retain a disc at least partially within the recess; and iii) a spacing rim upstanding from the planar surface, the spacing rim including a lateral side opposing the first side, and two transverse sides, wherein in the closed position, the spacing rims do not overlap.

2. A package as recited in claim 1, wherein in the closed position, a thickness of the package is approximately equal to the first and second opposing panels plus a height of the spacing rim of the first partial tray.

3. A package as recited in claim 2, wherein the recesses are semi-circular.

4. A package as recited in claim 1, further comprising means for retaining the package in the closed position.

5. A package as recited in claim 4, wherein the means is at least one female receptacle formed on the first partial tray and at least one male projection formed on the second partial tray to engage the at least one female receptacle.

6. A package as recited in claim 1, wherein in the closed position, the spacing rims are laterally spaced with respect to each other.

7. A package as recited in claim 1, wherein the cover is paper board and the trays are plastic.

8. A package as recited in claim 1, wherein the transverse sides are interconnected by the lateral side to form a U-shape on each partial tray.

9. A package as recited in claim 1, wherein the opposing panels, spine panel and partial trays are rectangular.

10. A package for housing two discs comprising:
   a) a cover forming an elongated spine panel in a plane with first and second opposing panels extending therefrom such that the opposing panels selectively rotate between an open position in which the opposing panels are substantially in the plane and a closed position in which the opposing panels are substantially perpendicular to the plane;
   b) a first partial tray attached to the first opposing panel at a first end, the first partial tray having:
      i) a planar surface forming a periphery, a substantially semi-circular recess opening to the periphery on a first side and finger wells opening to the recess;
      ii) a rosette located centrally within the semi-circular recess for engaging a central aperture of a disc;
      iii) a spacing rim upstanding from the planar surface, the spacing rim including a lateral side opposing the first side and two transverse sides, the lateral and opposing sides being near the periphery; and
      iv) a male projection for retaining the package closed; and
   c) a second partial tray attached to the second opposing panel at a second end opposing the first end, the second partial tray having:
      i) a planar surface forming a periphery, a substantially semi-circular recess opening to the periphery on a first side and finger wells opening to the recess;
      ii) a rosette located centrally within the semi-circular recess for engaging a central aperture of a disc such that the rosettes are substantially co-axial in the closed position;
      iii) a spacing rim upstanding from the planar surface, the spacing rim including a lateral side opposing the first side and two transverse sides, the lateral and opposing sides being near the periphery; and
      iv) a female receptacle for engaging the male projection to selectively retain the package closed.

11. A package as recited in claim 10, further comprising a second male projection on the first partial tray and a corresponding second female receptacle on the second partial tray such that as the package is closed, the second male projection and the second female receptacle serve to align the opposing panels.

12. A package as recited in claim 11, wherein the second male projection and the second female receptacle serve to retain the opposing panels in the closed position.

13. A package as recited in claim 10, wherein a height of the spacing rims is substantially equal to a transverse thickness of the spine.

14. A package as recited in claim 10, wherein the transverse sides are interconnected by the lateral side to form a U-shape on each partial tray.

15. A package as recited in claim 10, wherein in the closed position, the spacing rims are laterally spaced with respect to each other.

16. A package for housing two discs comprising:
   a) a paper board cover forming an elongated spine panel in a plane with first and second opposing panels extending therefrom such that the opposing panels selectively rotate between an open position in which the opposing panels are substantially in the plane and a closed position in which the opposing panels are substantially perpendicular to the plane;
   b) a first unitary plastic partial tray attached to the first opposing panel at a first end, the first partial tray having:
      i) a planar surface forming a periphery and a substantially semi-circular recess opening to the periphery on a first side;
      ii) a rosette located centrally within the semi-circular recess for engaging a central aperture of a disc;
      iii) a spacing rim upstanding from the planar surface, the spacing rim including a lateral side opposing the first side and two transverse sides, the lateral and opposing sides being near the periphery; and
      iv) a male projection; and
   c) a second unitary plastic partial tray attached to the second opposing panel at a second end opposing the first end, the second partial tray having:
      i) a planar surface forming a periphery and a substantially semi-circular recess opening to the periphery on a first side;
      ii) a rosette located centrally within the semi-circular recess for engaging a central aperture of a disc such that the rosettes are substantially co-axial in the closed position;
      iii) a spacing rim upstanding from the planar surface, the spacing rim including a lateral side opposing the first side and two transverse sides, the lateral and opposing sides being near the periphery; and
      iv) a female receptacle for engaging the male projection to selectively retain the package closed.

17. A package for housing two discs comprising:
   a) a cover forming a spine panel with first and second opposing panels extending therefrom such that the opposing panels selectively rotate between open and closed positions, the first and second panels each having a pair of lateral sides with a first length between the lateral sides; and
   b) first and second partial trays attached to the first and second opposing panels, respectively, each partial tray having: i) a surface forming a recess; ii) a rosette near a first side of the tray for engaging and retaining a disc at least partially within the recess; iii) a tray length approximately one half the first length; and iv) a spacing rim upstanding from the surface, wherein in the closed position, the spacing rims do not overlap.

18. A package as recited in claim 17, wherein the spacing rim includes a lateral side opposing the first side, and two transverse sides, the transverse sides being interconnected by the lateral side to form a U-shape on each partial tray, and in the closed position, the spacing rims are laterally spaced with respect to each other.

19. A package as recited in claim 17, wherein the spacing rims are near a periphery of the respective panel.

20. A package as recited in claim 17, wherein a height of the spacing rims is substantially equal to a transverse thickness of the spine.

\* \* \* \* \*